(12) United States Patent
Ganelin et al.

(10) Patent No.: US 8,555,978 B2
(45) Date of Patent: Oct. 15, 2013

(54) DUAL PATHWAY RISER AND ITS USE FOR PRODUCTION OF PETROLEUM PRODUCTS IN MULTI-PHASE FLUID PIPELINES

(75) Inventors: Boris Ganelin, Brooklyn, NY (US); Michael W. Kenworthy, Chester, VT (US)

(73) Assignee: Technology Commercialization Corp., Chester, VT (US)

( * ) Notice: Subject to any disclaimer, the term of this patent is extended or adjusted under 35 U.S.C. 154(b) by 387 days.

(21) Appl. No.: 12/955,786

(22) Filed: Nov. 29, 2010

(65) Prior Publication Data

US 2011/0127029 A1  Jun. 2, 2011

Related U.S. Application Data

(60) Provisional application No. 61/265,969, filed on Dec. 2, 2009.

(51) Int. Cl.
*E21B 7/12* (2006.01)
(52) U.S. Cl.
USPC ............ 166/344; 166/346; 166/352; 166/357
(58) Field of Classification Search
USPC ......... 166/344–346, 351, 352, 357, 367, 369, 166/373; 405/184.5, 224.2–224.4; 138/111
See application file for complete search history.

(56) References Cited

U.S. PATENT DOCUMENTS

| | | | | |
|---|---|---|---|---|
| 3,022,822 A * | 2/1962 | Loy, III et al. | ............ | 166/250.01 |
| 3,339,635 A * | 9/1967 | Brandon | ........................ | 166/249 |
| 3,495,380 A * | 2/1970 | Goldman et al. | ................ | 95/153 |
| 3,502,103 A * | 3/1970 | Verschuur | ................ | 137/565.33 |
| 3,826,279 A * | 7/1974 | Verschuur | ...................... | 137/896 |
| 4,252,465 A * | 2/1981 | Broussard et al. | ............ | 405/158 |
| 4,366,356 A * | 12/1982 | Ando | ............................ | 219/629 |
| 4,705,114 A * | 11/1987 | Schroeder et al. | ............ | 166/357 |
| 4,753,261 A * | 6/1988 | Zagustin et al. | ................ | 137/13 |
| 5,232,475 A * | 8/1993 | Jepson | ............................ | 95/260 |
| 5,950,651 A | 9/1999 | Kenworthy et al. | | |
| 6,443,240 B1 * | 9/2002 | Scott | ................................. | 175/7 |
| 7,473,844 B2 * | 1/2009 | Figenschou et al. | ............ | 174/47 |
| 7,490,671 B2 * | 2/2009 | Gramme et al. | .............. | 166/357 |
| 7,516,794 B2 * | 4/2009 | Gramme et al. | .............. | 166/357 |
| 7,540,902 B2 * | 6/2009 | Esparza et al. | .................. | 95/243 |
| 7,703,535 B2 * | 4/2010 | Benson | ......................... | 166/368 |
| 7,771,522 B2 * | 8/2010 | Esparza et al. | .................. | 96/204 |
| 8,080,157 B2 * | 12/2011 | Fenton | ..................... | 210/170.01 |
| 2005/0006086 A1 * | 1/2005 | Gramme | ..................... | 166/105.5 |
| 2009/0223672 A1 * | 9/2009 | Naik | ............................ | 166/344 |

* cited by examiner

*Primary Examiner* — Matthew Buck
*Assistant Examiner* — Aaron Lembo
(74) *Attorney, Agent, or Firm* — Boris Leschinsky

(57) ABSTRACT

Disclosed is a tubing system for transporting a gas-liquid flow from a well to a production platform or processing facility. It includes a dual pathway section between the well and the production point having a first tubing portion and a second tubing portion. The second tubing portion includes a plurality of parallel channels so as to divide the multi-phase flow into a plurality of flows through individual channels. This is done to reduce flow slippage of the lower viscosity portion of the flow, which may lead to inefficiencies in flow characteristics, and often, undesirable cyclical variations in pressure and fluid volume. This is especially useful in inclined portions of the petroleum flow pipe system and along hilly terrain. The first round tubing portion is used for transporting the gas-liquid flow as well as for maintenance purposes, such as for pigging, fishing or coiled tubing operations.

19 Claims, 15 Drawing Sheets

Slug flow development

Formation of riser slugging

Hybrid Riser Tower Configuration

Side view

Top view

A'-A'

Bundle with encapsulated lines and structural core.

Bundle with lines within a structural carrier pipe

Bundle with lines external to buoyancy and core pipe

DUAL PATHWAY RISER AND ITS USE FOR PRODUCTION OF PETROLEUM PRODUCTS IN MULTI-PHASE FLUID PIPELINES

BACKGROUND

To maintain and repair wells, risers and pipelines in land-based and subsea petroleum well production systems (tubing systems), it is important to have access from one end of the pipe/tube/riser/conduit/well/gathering line for pigging, fishing or coiled tubing operations. Unrefined petroleum products flowing inside metal pipes are known to build up deposits of scale, paraffin and asphaltine compounds on the walls of the pipes. Pigging operations to clean the pipes are performed as often as monthly and more, requiring production to be interrupted for about 2 days.

Multi-phase fluid flowing through tubing systems is a common occurrence in petroleum production systems given that oil wells are usually co-produced with gas, and that gas wells are usually co-produced with water. Such multi-phase fluid from the well is transported through the tubing system to the production point, where the fluid is processed (separated into gas, oil and water). Such production point for subsea petroleum wells is typically the surface platform. Land-based multi-phase tubing systems typically consist of gathering lines to concentrate produced fluid at one large processing facility.

As production of an oil well progresses and the pressure declines in the reservoir, the proportion of free gas phase present in the pipes increases systemwide as more gas comes out of solution. As the gas phase expands, less efficient gas-liquid mixture flow regimes (more gas phase slippage past liquid) form in the conduits systemwide leading to lower liquid production. In vertical conduits, the flow progresses through the following flow regimes in declining order for liquid production: bubble flow, slug flow, churn flow, annular flow and then misty annular flow. In horizontal or inclined conduits, the flow progresses through the following flow regimes: bubble flow, stratified flow, stratified wavy flow, elongated bubble flow, slug flow, annular flow and then misty annular flow.

Similarly, as gas wells mature, the reservoir pressure declines and increasing quantities of water are produced, which inhibits the flow of the gas phase and accelerates the decline in gas production. Any water produced will be detrimental to the flow of gas, adding to the mass of the production fluid. From the perspective of flow assurance, more problematic is the tendency for the water to collect in the lower region of the well (in the wellbore), pipelines and toward the bottom of risers, reducing the cross sectional area of the gas to travel (choke effect) and commonly leading to the blockage of the flow of gas (see FIG. 1).

When large slugs form, the liquid does not move until the gas pressure behind the blockage builds up high enough to push the liquid out of the low spot as a slug. Large cyclical flow rates initiated by severe slugs can cause major problems for surface equipment like separator vessels and compressors (see FIG. 2).

Slugging in the riser occurs when the system pressure-loss becomes dominated by hydrostatic head losses, rather than by friction. This is usually the case for a non-choked pipeline-riser. In order to establish a stable, friction-dominated system, a choke near the top of the riser can provide a pressure drop comparable to the hydrostatic head loss over the riser when full of liquid. While this common technique moderates the intensity of slugging behavior, it wastes the potential energy of the reservoir due to the increase in backpressure induced by the high choke pressure.

A number of methods have been employed to control or mitigate slug formation. Active control of subsea chokes can stabilize the wellhead pressure with frequent choke adjustments, but these add complexity to the system and moderate not control slugging behavior. Riser base gas injection (so-called "gaslift") is a common technique to avoid slugging by continually injecting gas into the riser, preventing the build-up of liquid and resultant blockage to gas flow. Riser base gaslift mitigates severe slugging, reducing the mass of the slug and so the magnitude of its impact. While gaslift mitigates severe slugging behavior, it also adds to capital costs, operating complexity and ongoing expense of gas and compression.

The invention is not to be confused with so-called "dual bore completions" or a "dual riser" in subsea systems, such applications relate to improving access during drilling, service or repair operations, not for providing an alternate production fluid path or for altering flow dynamics of the fluid flowing through the production pipe/riser as disclosed by the present invention. In U.S. Pat. No. 6,443,240, Robert Scott describes a novel method and apparatus for offshore drilling operations, more specifically, relating to a dual riser method and apparatus for use in drilling and/or production work over a single well hole in deep water applications, enabling a deep water drilling rig to have dual turntables to work simultaneously through two parallel risers to shorten the critical path associated with deep water drilling and/or workover activity.

There is a substantial need therefore to improve/manage the gas-oil-ratio of producing oil wells to improve reservoir depletion characteristics, to continuously evacuate liquid accumulating in the wellbore of gas and condensate wells to increase gas production rates, to control liquid slugging in risers and in pipelines with hilly terrain and to protect surface production facilities and pipelines from irregular fluid production, while at the same time permit access for pigging, fishing and coiled tubing operations.

The present invention comprises a combination of features and advantages that enable it to overcome various problems with the prior methods. The various characteristics described above, as well as other features, will be readily apparent to those skilled in the art upon reading the following detailed description of the preferred embodiments of the invention, and by referring to the accompanying drawings. Any design feature or method described in any one embodiment of the invention may also be assumed for potential application in any of the other embodiments described herein.

SUMMARY OF THE INVENTION

Accordingly, it is an object of the present invention to overcome these and other drawbacks of the prior art by providing novel methods and devices for managing/improving the fluid flow characteristics in wells, risers and hilly terrain pipelines of oil, gas or condensate (cumulatively referred to here as petroleum) well systems by provision of an alternate tubular pathway for producing reservoir fluids that is internally reconfigured to affect the gas-liquid flow dynamics through the conduit/pipeline/riser/well, whereby the carrier phase (gas) more efficiently transports the carried phase (liquids or solids). To maintain and repair wells, risers and pipelines throughout subsea and land-based well production tubing systems, it is important to have access from the surface for pigging, fishing or coiled tubing operations and for land-based pipelines to have access end-to-end for pigging operations. The requirement of maintaining a sufficiently large pipeline/riser/well tubing diameter for such access precludes alteration in the design of the pipe itself as anticipated by the invention, thereby making it necessary to provide an alternate pathway.

Further, it is an object of the present invention to improve the flow characteristics in such alternate production wells, risers or hilly terrain pipelines of oil, gas or condensate wells by subdividing the flow into a plurality of individual fluid flows through substitution of an open pipe/conduit with one having a plurality of smaller parallel channels such as pipes placed inside, each such parallel pipe having a smaller cross-sectional area than the single open pipe, and preferably round inside. By virtue of reducing the diameter of the flow channel, the gas phase is less likely to slip past the liquid phase, thereby forcing an increase in the transfer of energy from the gas (carrier phase) to the liquid (carried phase), resulting in a lower producing gas-liquid ratio (GLR) downstream.

Further, it is an object of the present invention to improve the flow characteristics in wells, risers or hilly terrain pipelines of petroleum wells by virtually eliminating liquid slugging by way of dividing the flow into a plurality of smaller cross-section flows. Liquid slug length is highly correlated with the diameter of the flow pipeline, with smaller diameter pipes producing shorter liquid slugs, and so the invention will result in a smaller average length/mass for each slug. Second, such smaller liquid slugs from such plurality of parallel small riser columns arriving at the subsurface/surface facilities will each arrive independently. Greater number of independent pipes/tubes/flows causes a greater tendency to statistical averaging of the flow volume/mass exiting the riser at any given moment. This in turn reduces the potential for any single large liquid slug to arrive at the surface facilities. Third, a preferred design uses relatively small diameter (6 to 25 mm) internal pipes as compared to the 4-to 6-inch diameter pipes commonly used in practice. The flow through these small pipes will have the annular flow regime toward the top of the column and in a significant proportion down its length, given the effect of containment by virtue of the small diameter pipes. As the proportion of gas in the flow increases when more gas comes out of solution with increased elevation/distance (lower pressure) and as the gas phase expands with declining pressure (eventually resulting in annular flow), the recombined flow at the surface has a steady-state nature and therefore will not damage the surface facilities (separators, slug catcher, pipes, etc.).

Further, it is an object of the present invention to provide the capability to adjust the volumetric characteristics of the subsea production system over the life of the well to accommodate the reduced flow conditions experienced as reservoir depletion ensues. Early in the life of a gas-driven oil well for example, a large diameter pipe is beneficial to maximize production (high pressure and flux). But in lower flow rate conditions, as the gas phase void fraction increases throughout the system (and increasingly so downstream), decreasing the diameter of the production pipe increases the liquid proportion of the produced fluid (e.g. conversion to a smaller-diameter "velocity string" or "macaroni tubing" later in the life of an oil well to increase liquid production). The riser of the present invention, having a plurality of parallel small diameter pipes, is designed to be capable of being changed/replaced over the life of the well, substituting the one with a smaller diameter pipes (to increase transporting efficiency of free gas phase) or fewer pipes (adjust for less gas-liquid flux) over time to better optimize liquid production while minimizing gas production. In this vein, a subsea manifold connecting multiple wells to the entrance of multiple parallel high-efficiency risers of the invention, each such riser having a plurality of parallel small cross-section tubes/conduits inside, and the number of risers permitted to flow at any given time can be varied using valve control means based on the volume of the combined production of the wells, which is expected to vary over time. In this case, such dual pathway riser of the invention consists of more than one parallel valve-controlled riser/conduit having multiple parallel smaller-diameter internal passageways (in effect, a "multiple-pathway riser"). As such, the volumetric characteristics of the parallel riser system can be optimized over the life of the well(s) to maximize liquid production and to minimize the volume of gas or pressure differential needed to produce it, maximizing reservoir depletion.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE FIRST PREFERRED EMBODIMENT OF THE INVENTION

Figure 1:
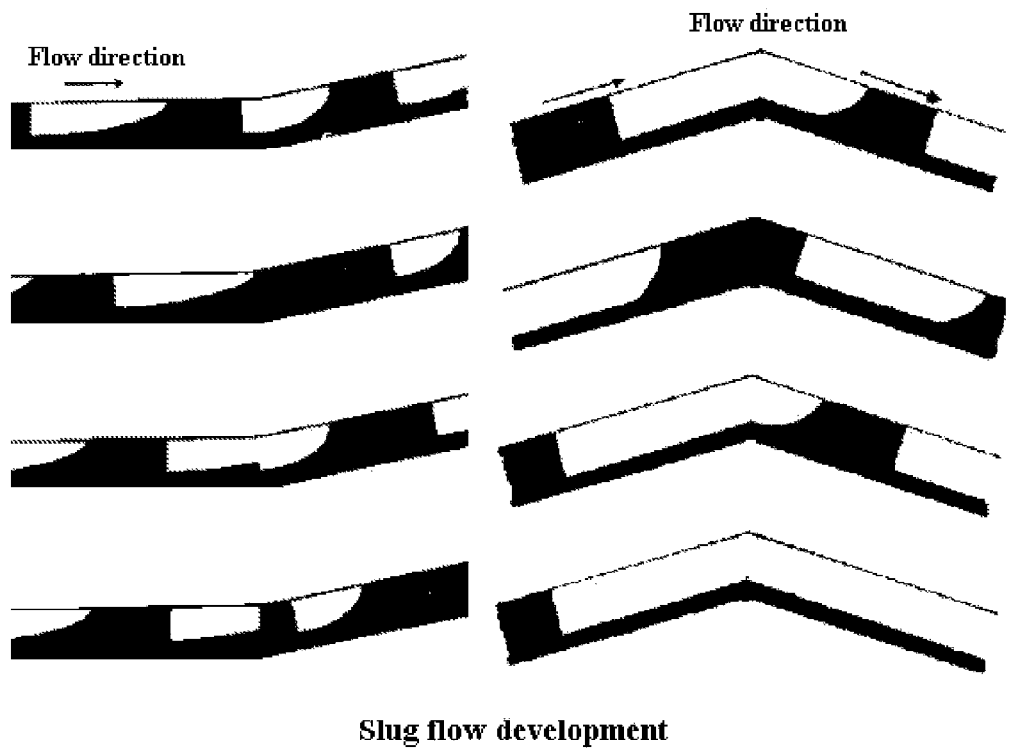
FIG. 1 illustrates formation of a slug in petroleum pipes.
Figure 1:
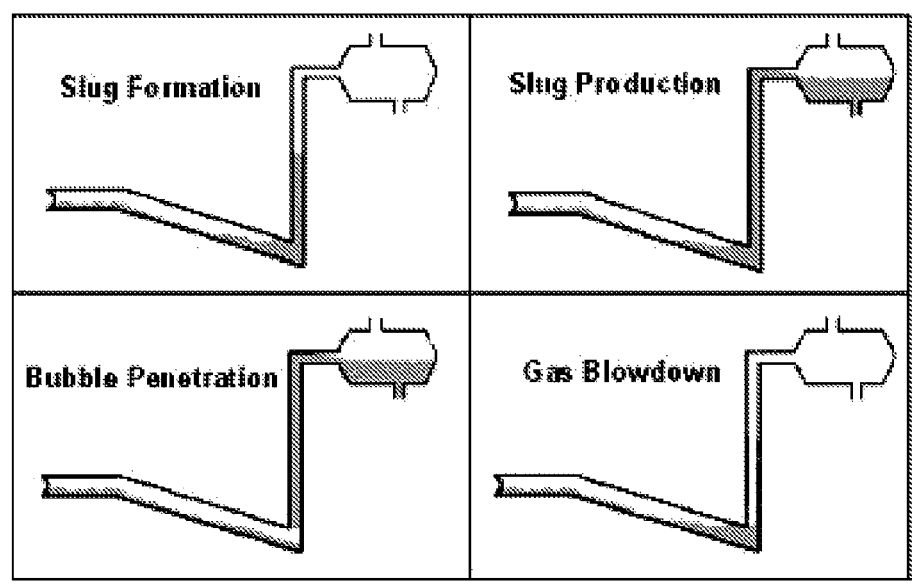
Figure 2:
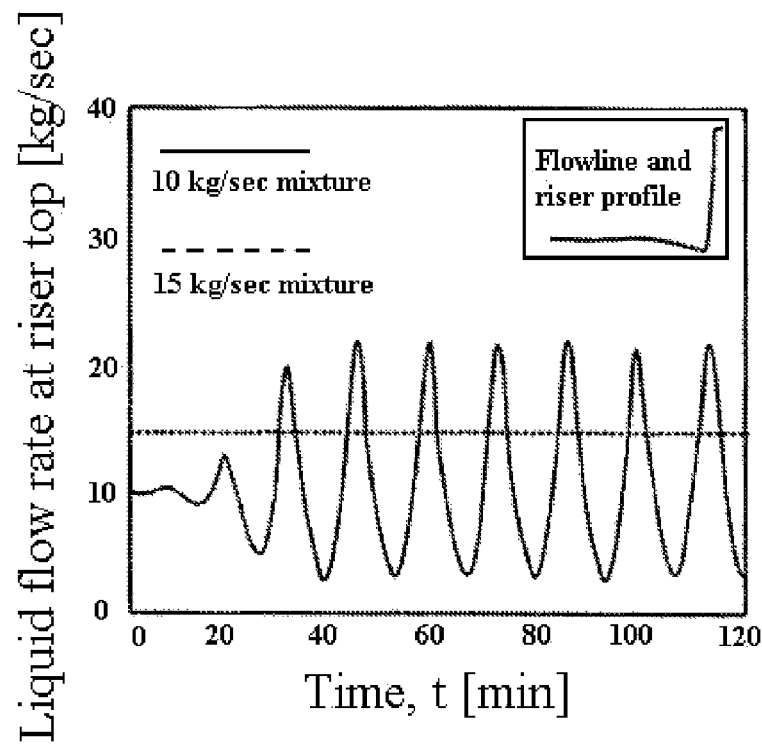
FIG. 2 illustrates variability in liquid production rate due to slugging.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A riser system for subsea oil and gas development and production consists of fluid conductor tubes/pipes providing fluid communication between the wellheads and the surface facilities. There are three basic types of riser systems, namely flexible risers, rigid risers and hybrid risers.

Figure 3:
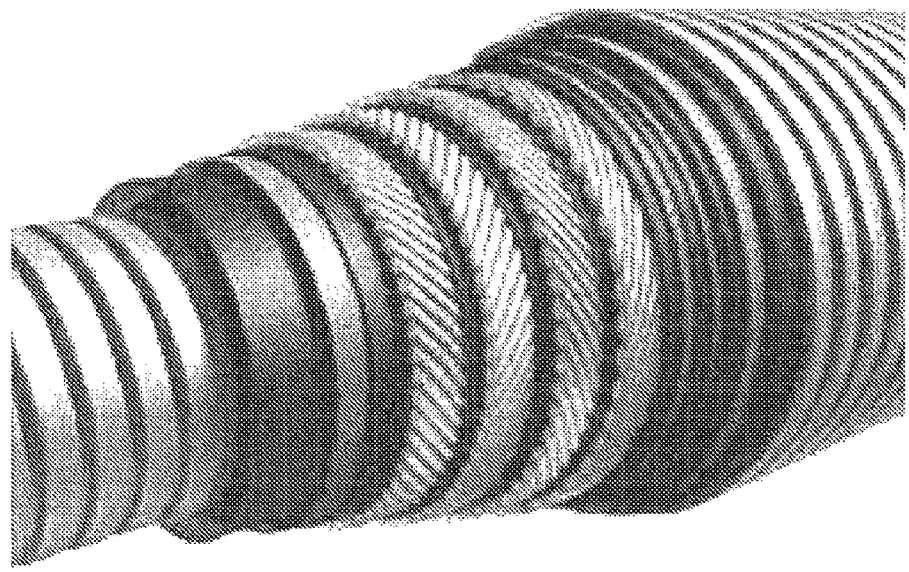
FIG. 3 shows an unbonded flexible pipe.

The main characteristic of a flexible riser is its low bending stiffness relative to its axial stiffness. This characteristic is achieved through the use of a number of layers of different material in the pipe wall fabrication. In so-called unbonded flexible pipelines used for flexible risers, these layers are able to slip past each other when under the influence of external and internal loads, and hence this characteristic gives a flexible pipe its property of a low bending stiffness. The flexible pipe composite structure combines steel armor layers with high stiffness to provide strength (to prevent burst or collapse), and polymer sealing layers with low stiffness to provide fluid integrity. This construction gives flexible pipelines a number of advantages over other types of pipelines and risers such as steel caternary risers. These advantages include prefabrication, storage in long lengths on reels, reduced transport and installation costs, and suitability for use with compliant surface structures for receiving production fluids. See FIG. 3 for a common design of unbonded flexible pipeline showing the individual layers.

A flexible riser allowing a division of flow into smaller-diameter flows and positioned in parallel with a conventional open-pipe subsea riser will improve the gas-liquid flow dynamics (increased efficiency of the gas phase in lifting produced liquid and eliminate slugging), while at the same time allowing access from the surface to maintain and repair the undersea pipeline system (pigging operations, fishline operations, coiled tubing operations, etc).

Reference is made to U.S. Pat. No. 5,950,651, filed Sep. 14, 1999 by the same inventors and entitled "METHOD AND DEVICE FOR TRANSPORTING A MULTI-PHASE FLOW", and such patent is incorporated herein in its entirety by reference. U.S. Pat. No. 5,950,651 describes the physical principle whereby, in a gas-liquid mixture flowing in a pipe or conduit, the proportion of liquid in the fluid at the end of such pipe is greater when the flow is segmented into multiple flows of smaller cross-sectional area. All cross-section designs for segmenting the flow described in such patent are intended to be included in the present invention by reference.

The benefit of the invention, namely improving the two-phase flow characteristics in a riser, was demonstrated in an aging gas well in Kansas in 2008, which showed an increase in the efficiency of the energy transfer from the gas phase to the liquid phase (reducing the gas-liquid ratio) and the maintenance of a steady-state flow rate (no slugging behavior). A long round extrusion having multiple small-diameter internal passageways (so-called "multi channel system", or MCS) was installed in a 1,900-foot gas well. Gas production in the well had declined to where flow was intermittent and trending down due to excess water production, requiring soap treatments to maintain flow despite a shut-in bottom hole pressure of 285 psi. After MCS installation, well kickoff and liquid evacuation, the well produced 20 thousand cubic feet per day of gas plus over 3 barrels of water with 50-80 psi line pressure and 280 psi at the top of the casing. Steady-state flow was established, with line and casing pressures staying within a 10% range for the following 6 months and more. The meter differential was exceptionally smooth. Sub-zero weather had no effect on production volumes. Water salinities were in excess of 130,000 parts per million NaCl equivalent with no sign of deposits or plugging. Once installed, the system was virtually maintenance free. It was estimated that the reservoir abandonment pressure of this gas well would be reduced by 5 to 10 percent due to the MCS installation.

Figure 4:
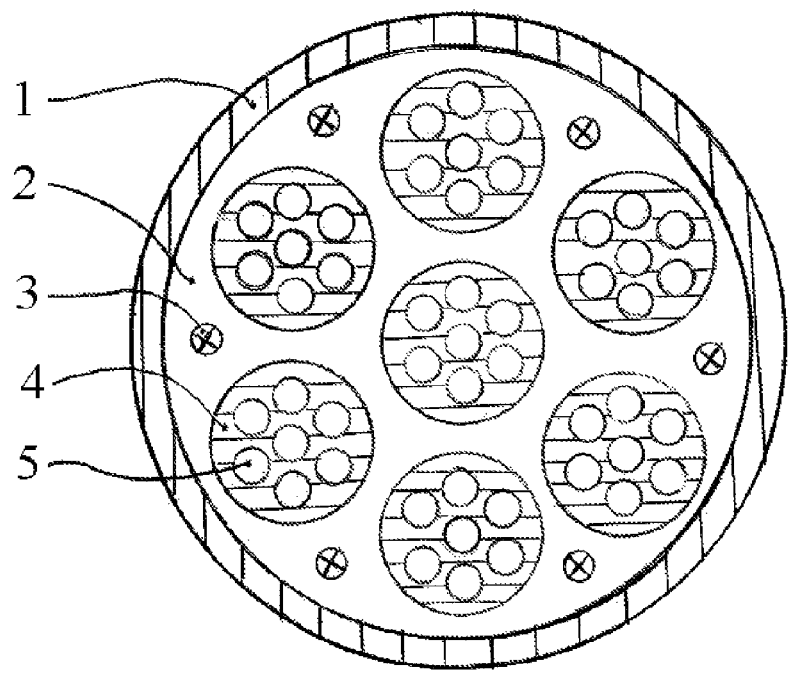
FIGS. 4a through 4e are cross-sections of the tubing portion having multiple channels therein according to the first embodiment of the invention.
Figure 4:
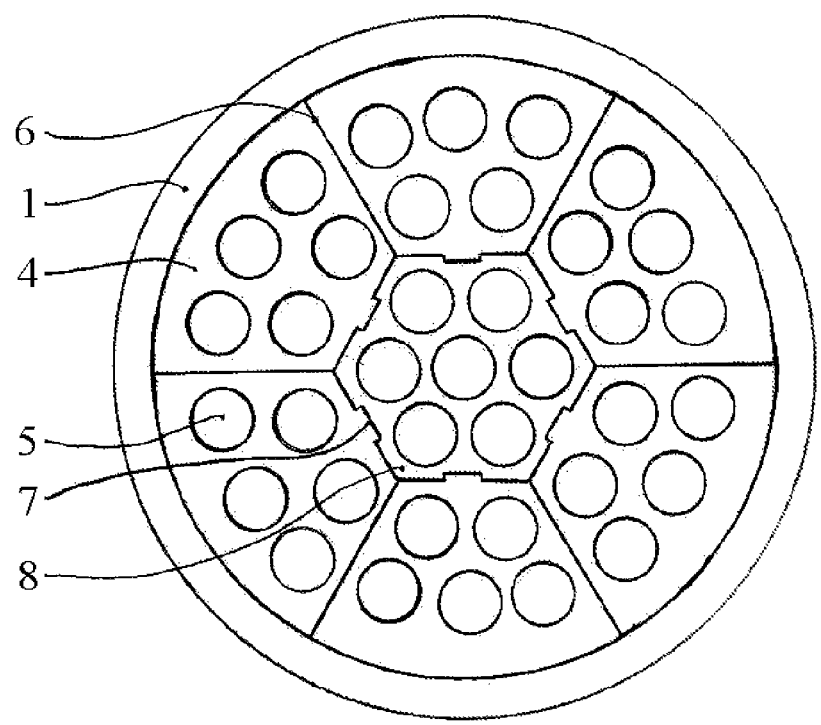
Figure 4:
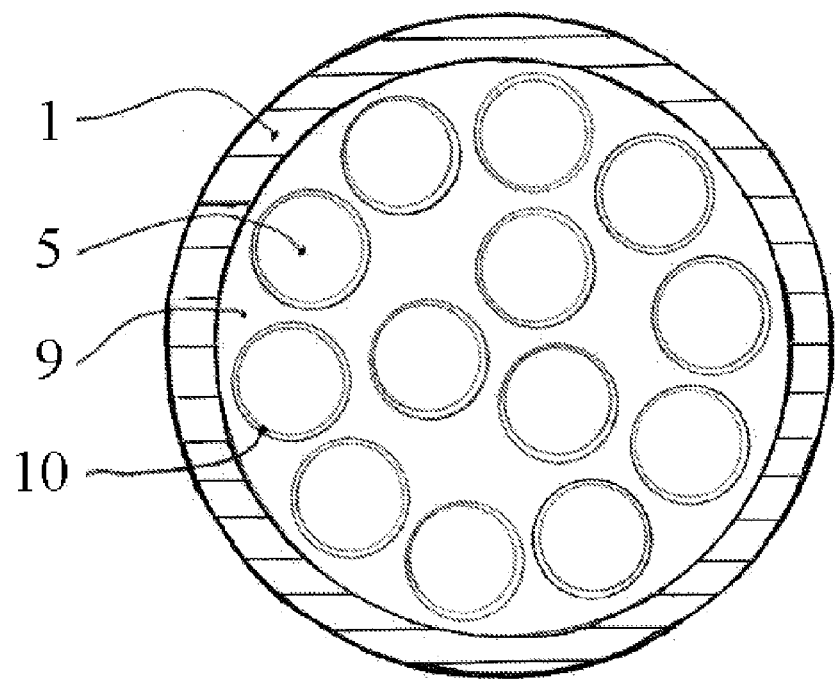
Figure 4:
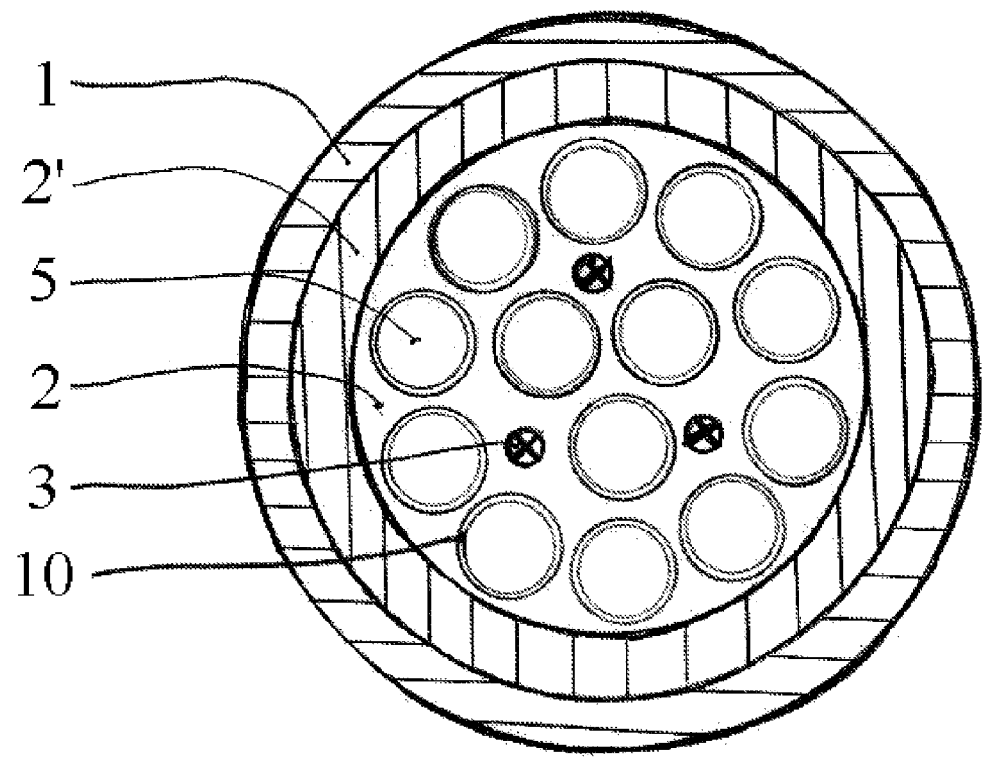
Figure 4:
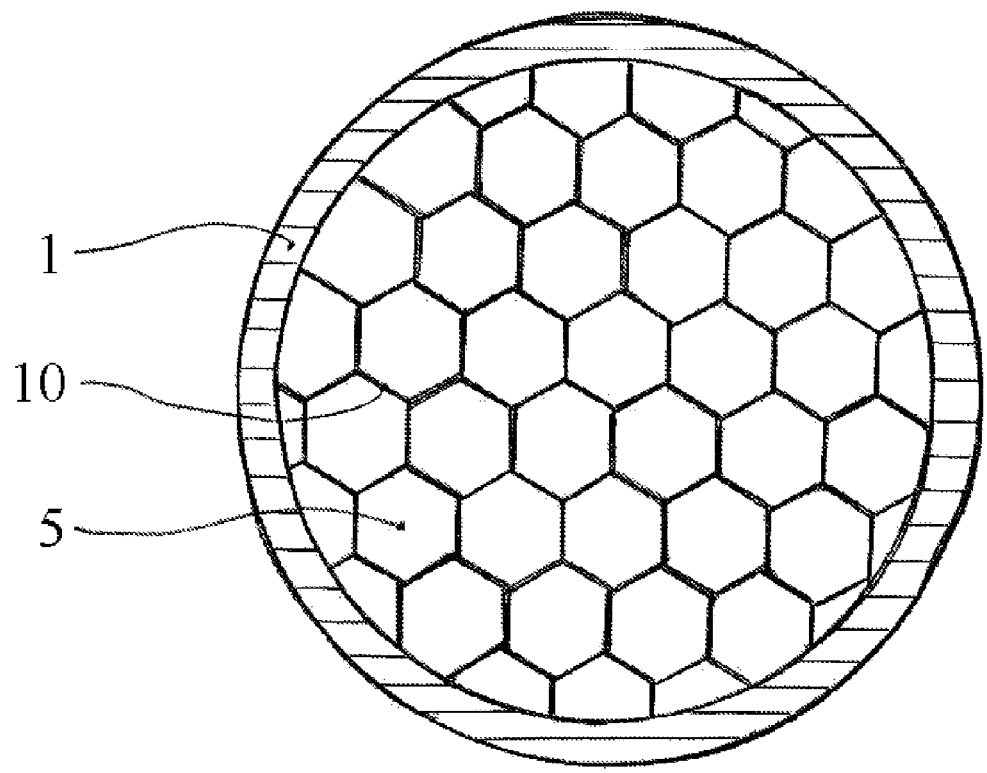

As per the invention, a cross section view is shown in FIG. 4(a), multiple lengths of extruded elastomer material (or potentially extruded metal) (4) each having a cross section with multiple small-diameter longitudinal holes inside (5) is encased in an outer conduit (1), together with insulation filler (preferably foam) (2) and optional heating elements (3). Given the limitations on the thickness of the cross-section when producing extruded elastomer materials, this design utilizes a number of extrusions, each with multiple internal round passageways. They are placed together side-by-side (possibly with spacers between them) inside a larger diameter round tubing within a preferably injected foaming material between to eliminate any gaps/spaces between the multiple MCS extruded lengths so as to prevent flow and to ensure insulation integrity.

Such outer tubing conduit (1) is preferably constructed using a design similar to that of an unbonded flexible pipe (see FIG. 3), selecting from a variety of functional layers: an inner carcass, an inner fluid barrier, pressure armor, an anti-wear layer, tensile armor, another anti-wear layer, armor wire, anti-birdcaging layer, and an external fluid layer. Unbonded flexible pipes have been produced in lengths of several hundred meters, and end fittings (terminations) allow a large number of individual lengths to be attached together to make much greater combined lengths to accommodate riser systems in deep waters. Placing the semi-rigid round extruded elastomeric MCS lengths inside the unbonded flexible pipe will improve its resistance to being crushed or damaged, and the elastomer will provide buoyancy to the riser since its mass is less than seawater.

An alternate design includes a large-diameter multi-tube/passageway construction using formed or extruded lengths of elastomer which are assembled/fitted along side with other similar extruded lengths of elastomer, together forming a large circular cross-section profile for the combined extrusion capable of being encased in an unbonded flexible pipe as per above. See FIG. 4(b) for one such design, where six peripheral extruded segments (4) surrounding a central extruded segment (8), each having small holes/passageways (5), are tightly held together with an optional wire wrap or webbing (not shown). An outer conduit (1) has an unbonded flexible pipe construction with an optional heat-producing layer in between (not shown) for sections employed near the base of the riser. To reinforce the desired relative positioning between each of the extrusions, interlocking longitudinal slots (7) are preferably provided at their interfaces. Limiting the extent of tubing sliding relative to each other (creep) when the riser is bent, is achieved by 1) glue or epoxy at the interfaces between the extruded peripheral segments and the central segment, or 2) making crosswise grooves or ribs (not shown) in the interface (6) between the peripheral segments (4), or 3) providing a slight lengthwise spiraling of the peripheral segments (4) around the central one.

Another design of the invention includes a plurality of parallel tubing lengths (channels) of a preferred diameter (ID and OD) bundled together. Preferably, the individual tubes are twisted together longitudinally (similar to a wire rope) to improve the bending characteristics of the resulting assembly. In high-temperature environments such as when such MCS riser is inserted down into a parallel production tubing above the wellbore and below the wellhead, the small metal tubes (10) are preferably welded to each other and to the metal pipe/conduit (1) encasing such bundle (see FIG. 4(c)), formed either as individual lengths/joints of production tubing, or when incorporated within a length of coiled tubing. The spaces between the tubes (9) are welded closed (or thermite is used to weld and seal) to limit creep of individual tubes relative to each other and to minimize the amount of gas flowing between the tubes. In relatively low temperature environments (see FIG. 4(d)) where a plurality of individual extruded elastomer tubes (10) are used for making the MCS riser lengths, foam (2) is preferably injected into the gaps between the tubes for insulation and to prevent gas from flowing between the tubes, along with an optional additional insulating layer (2') and optional heating elements (3).

The oilfield is an environment of extremes for elastomeric materials. The high temperatures and chemical mixtures down hole require using elastomers that can withstand the environmental rigors and provide safe, reliable service. A group of elastomers known to survive in this environment is fluoroelastomers. Viton® fluoroelastomers, Kalrez® perfluoroelastomer and Zalak® high performance elastomeric combine the latest advances in chemical, temperature and pressure resistance with demonstrated cost savings over the process lifetime, and have been used extensively in the oil and gas production equipment, mostly for seals, O-rings, V-rings and gaskets. For the 2008 gas well MCS implementation in Kansas described above, Santoprene™ blend material was used for the MCS extrusion: a hard, black versatile thermoplastic vulcanizate (TPV) in the thermoplastic family.

There are a number of advantages of using plastic tubular elements (vs. steel) for producing and transporting two-phase fluid from petroleum wells. The surface roughness of elastomers is significantly less than steel, reducing wall friction (decreasing pressure losses). Maintaining (high) production fluid temperatures maintains the low viscosity of the produced fluid, improving the hydraulic efficiency of its transport (lower viscosity) and reduces the potential for waxy and asphaltine hydrocarbons to become deposited on the tubular surfaces, and elastomers are better insulators than steel, an advantage in subsea pipelines and risers. U.S. Pat. No. 7,588, 058 assigned to I. E. DuPont discloses steel production tubing having a lining comprising a fluoropolymer adhered to its interior surface, indicating particularly good non-stick surface properties for organic and non-organic compounds contained in petroleum fluids, where asphaltines did not stick at all, and the deposition rates for waxes and scale were significantly less, such effect increasing with the thickness of the bonded fluoropolymer layer. Methods to remove wax deposits include mechanical (reaming with a tool), heat treating (such as "hot oiling", where hot oil is circulated through the tubular to melt and remove the deposits), chemical (such as the use of solvents, wax crystal modifiers or paraffin dispersers), or some combination of the three. Elastomers are more buoyant than steel, reducing the need for buoyancy devices when used for subsea risers.

Subsea wellheads typically have at least two ports, one side port for the production fluid to exit, and another port on the top for vertical access during workover operations by workover ships for example. So-called dual risers have dual vertical production headers, providing dual access (one for access to the production line and the second to the annulus area) with hydraulically operated valves.

Figure 5:
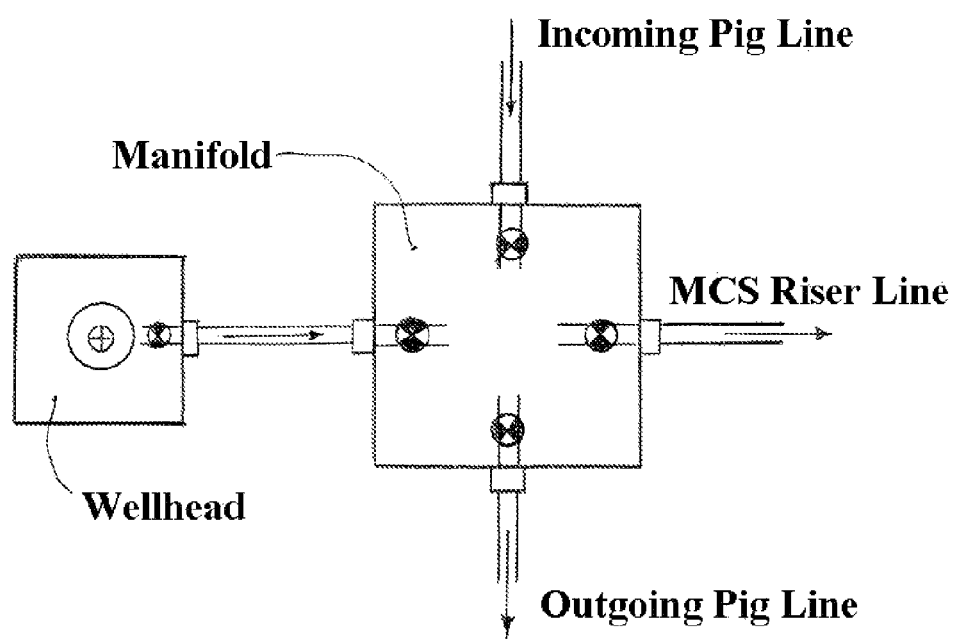
FIGS. 5a through 5c show various wellhead and manifold connections and configurations.
Figure 5:
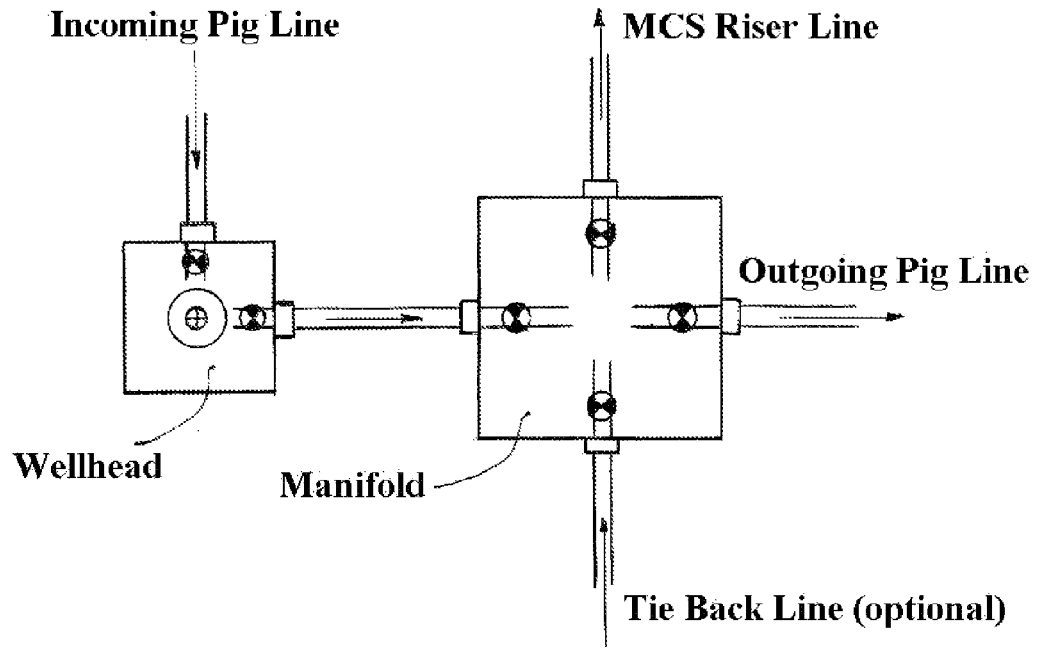
Figure 5:
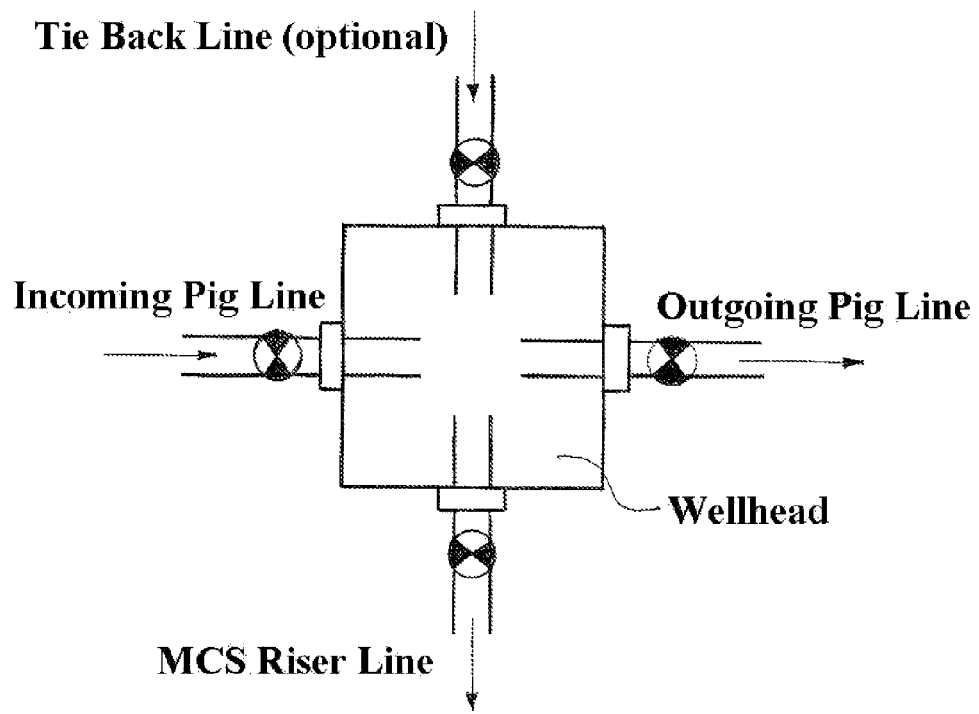
Figure 6:
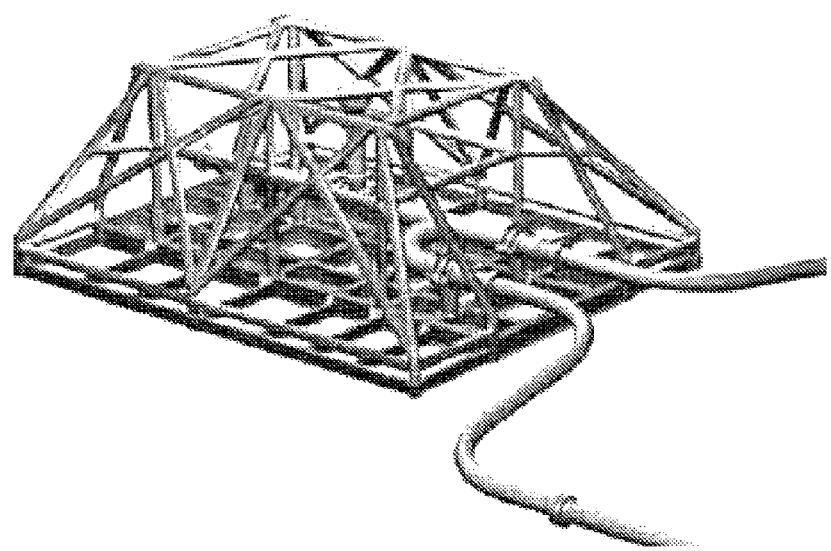
FIG. 6 shows a manifold controlling flow from one pipeline into two pipelines in an offshore pipeline system.
Figure 7:
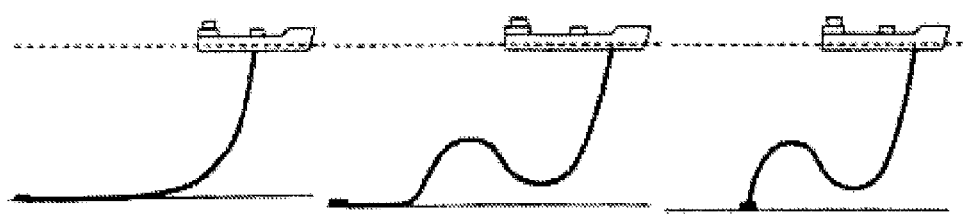
FIG. 7 illustrates various flexible riser configurations.
Figure 7:
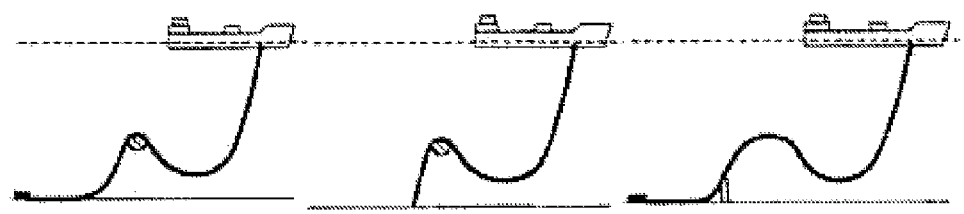

Several configurations are contemplated by the present invention when retrofitting a parallel MCS riser into a producing well. As per FIG. 5(a), a jumper line leads from the wellhead to the subsea manifold, where 1) the flow can be directed to either the MCS riser line or the original open-pipe riser (outgoing pig line), 2) there is one port for an incoming pig which exits through the original open-pipe riser, and 3) an optional incoming port for a tie back line from another well(s). As per FIG. 5(b), the wellhead has one incoming port for a pigging line and one side port for produced fluids (and pig) to flow to a manifold which has one outgoing line for the pig, one outgoing line for the MCS riser and one optional incoming line for a tie back line. As per FIG. 5(c), a wellhead has one incoming port for a pigging line, one outgoing port for the pig, one outgoing line for an MCS riser and one optional incoming port for a tie back line. See FIG. 6 for an example of a subsea manifold. Methanol and other inhibiting fluids (for asphaltines, waxes and hydrates) can be injected into the MCS riser fluid in the manifold or wellhead if required, or down from the top of the MCS riser.

The surface termination of the additional MCS riser is the same as any other production riser. Downstream is a surface choke to control flow, then on to the separator. No provision for a slug catcher or flow cycling is necessary, reducing capital expense and improving safety and reliability.

A commonly used technique for controlling slugging behavior is to increase backpressure by increasing flow restriction at the surface choke. Given the steady-state nature of the flow in the MCS riser vs. the traditional open-pipe riser (having slugging behavior), there is no need to put extra backpressure on the well, so the pressure drop in the riser can be increased.

A parallel MCS riser can optimize utilization of the significant potential energy available in the fluid at the bottom of the riser to lift the liquid phase (expansion of gas phase, and more free gas coming out of solution). This is beneficial for both a new well (more-fully utilizing the available potential energy of the pressurized/dissolved reservoir gas, preserving the reservoir gas) and for an aging well (produces the well down to lower reservoir pressure to increase recovery, and eliminates slugging behavior).

For flexible risers as commonly used, there are two design aspects in particular that are deleterious to the efficient flow of the gas/liquid production fluid, leading to a higher GLR. First, the sloping incline in the caternary riser designs commonly used (see FIG. 3) is particularly conducive to gas slippage past the liquid in the stratified flow regime, such regime commonly present in the pipeline approaching the riser. With an MCS having the preferential diameter of small passageways (about 10 to 25 millimeters for oil wells) and the preferred number of small tubes (e.g. about 20 to 45 tubes of 20 mm diameter replacing a 6-inch diameter open pipe riser), the inefficient, intermittent and potentially destructive slug flow regime is replaced by a steady state flow having a higher velocity with less fluid recirculation or fallback, and so not as impacted by the negative effects of the slug-inducing sloping incline up in such flexible riser as with an open pipe caternary riser. Second, the inside surface of flexible risers is typically a spiral-wound metal carcass (armor), a surface with a very high equivalent surface roughness leading to vortices in the fluid and waste of energy. The inside surface of the smaller diameter MCS passageways is elastomeric, a material that is very smooth, such that the frictional factor can be nearly ignored from consideration.

In the event that the individual small-diameter tubes of the MCS riser become coated with deposits or clogged by debris, the individual tubes can be accessed/maintained from the top/surface. The first valve at the bottom of the riser should be closed, and production can optionally continue through the other (open pipe) riser without interruption. A reaming device can be inserted into each individual small-diameter tube of the MCS riser from the surface and run through its length to the bottom, pushing any debris out the bottom end (or pulling it back to the surface when an expanding diameter tool is used which is actuated at the bottom of the riser, more force on the tool possible due to pulling of tool line vs. pushing it). Given that a plurality of individual lengths/sections of flexible tubing will likely be joined to become the full riser length, and given that in some MCS riser designs there could be many individual tubes (>25), it is preferable for the receiving (newly entered by reaming tool) flexible pipe section to have MCS tubes with a fluted entrance (funnel) to facilitate the reaming tool entering each successive tube. Gaps between joints/sections will not reduce efficiency significantly, only that the gap between the near-abutting small-diameter tubes of the respective two sections is preferably kept relatively small, 6 to 20 inches. The full inside diameter of the conduit encasing the MCS tube bundle should be maintained to provide for reaming from one section to the next. After all of the individual tubes have been reamed, high-pressure fluid injected from the top of the MCS riser pushes the debris out of the MCS riser and into the flow that is being produced up the open pipe riser and into the separator. After all such debris has been evacuated from the MCS riser, production can be re-routed back to the MCS riser (opening the first valve at the bottom and the second valve at the surface), then closing the valve at the top of the open pipe riser.

Another benefit of providing a second riser is redundancy. The riser is a critical part of the production system, and if something should cause a temporary shutdown that can potentially be avoided, then the potential to continue production can be economically beneficial.

Second Preferred Embodiment Of The Invention

Figure 8:
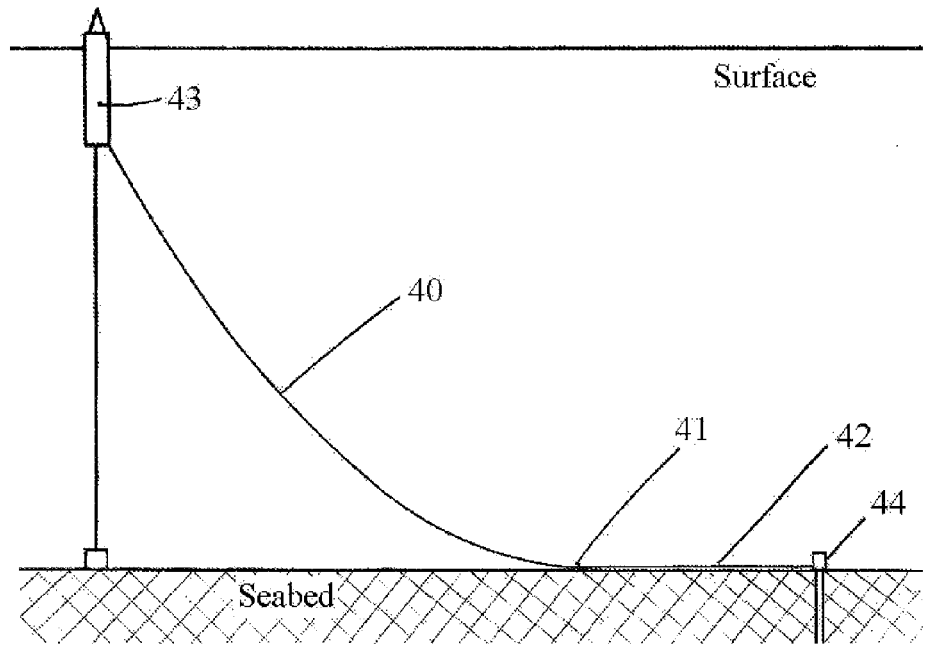
FIG. 8 shows a traditional steel caternary riser configuration.

Steel caternary risers (SCRs) are commonly used for deep-water wet-tree oil, gas and condensate well production. A common configuration is shown in FIG. 8, where well is produced through wellhead (44) with the fluid flowing through pipeline (42) to riser (40) to production spar (43). Steel tubing lengths are typically made of large-diameter half-shells (half-tubes) bolted and welded along their length (both seams) to make so-called "joints". These joints are bolted and butt-welded together to make a long large-diameter pipe/riser (generally 10 to 18 inches in diameter). SCRs are typically installed using the s-lay or j-lay method from a special-purpose surface vessel, where the joints are bolted and butt-welded together on the surface vessel and lowered down onto the seabed. The gradual bend of the steel riser length (40) makes for a long lateral distance until the touch-down point (41), about the same distance as the water depth. To increase efficiency, given the long time required to butt-weld the thick metal joints (up to 1 inch thick), single riser joints delivered to the subsea platform are often pre-assembled together into 4-joint lengths, and staged for later installation, speeding up riser construction.

Figure 9:
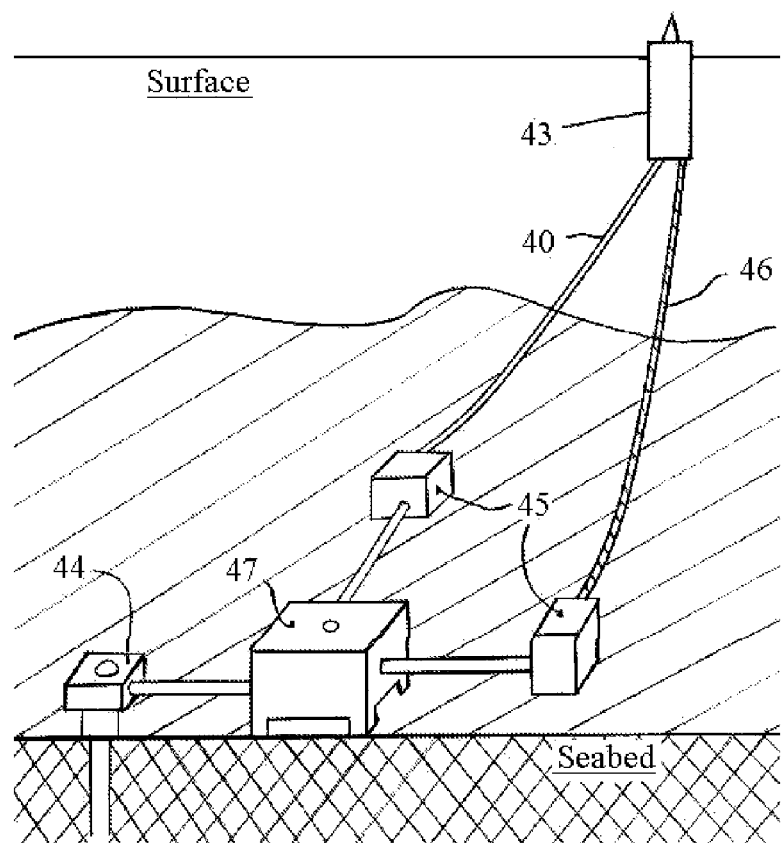
FIG. 9 shows a steel caternary riser configuration according to the second embodiment of the invention.
Figure 10:
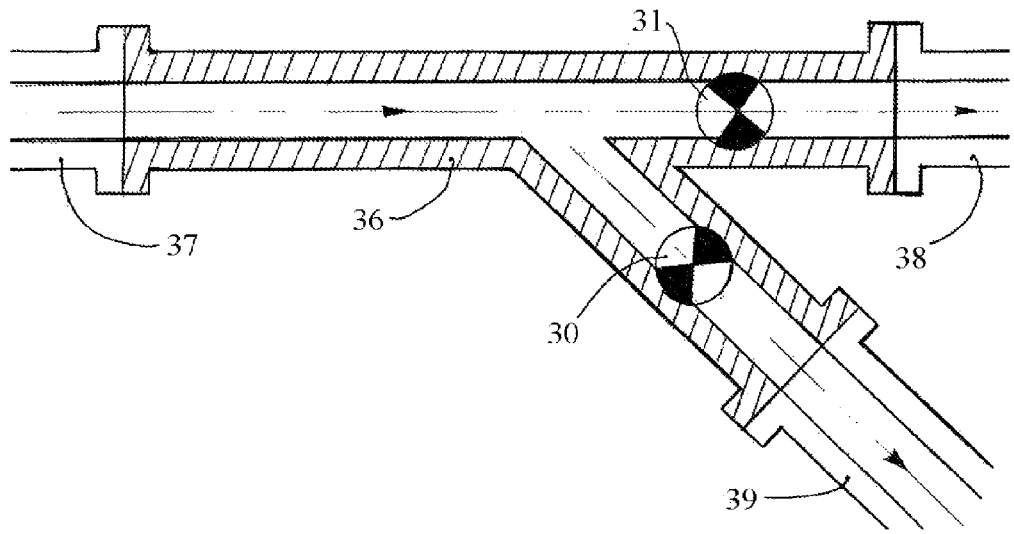
FIG. 10 shows an inlet, or first valve of the invention.

There are several configurations of the invention for accommodating a second riser (the MCS riser) when tying into the wellhead. One configuration is shown in FIG. 9, where produced fluid flows from wellhead (44) to manifold (47) which directs flow to either the open-pipe tubing (40) with connection (45) or to the MCS riser conduit (46) with connection (45), such connections preferably insulated as indicated by box. See FIG. 5(a), (b) and (c) for alternate configurations utilizing a manifold. Or alternatively, if the wellhead is a significant distance from the point where the riser meets the seabed, one or more of the steel joints of the SCR on the seabed can be removed (see FIG. 10), patching in a Y-joint (36) with an adjusting spool (37), and a jumper (39) leading to the MCS riser (not shown), both lines having independent valve control means (30 and 31) controlled from the surface. Capability to inject fluid inhibitors at the manifold is desirable (not shown).

Construction of a parallel MCS SCR riser can utilize any of the extrusion length/tubing configurations described in the First Embodiment. Preferably, the lengths of each tube or extrusion with internal passageways should be as long as practicable to improve the efficiency of the two-phase flow effects conferred by the MCS riser. As a result, working with industry practice of pre-assembling 4-joint lengths of the riser, 4 bottom halves (half-shells) are first bolted together, then a pre-assembled bundle of MCS tubes/extrusions 4 joints long is placed into such 4 bolted bottom halves, then 4 half-shells tops are bolted to the bottom half-shells and to each other, and then all seams are welded together. If foam insulation is used, foam injection lines are integrated into the MCS extrusion/tubing bundle, such that after welding the shells together they can be withdrawn at a steady rate while injecting foam, thereby effectively providing foam access to the vacant spaces between the tubes or extrusions along its full length. To improve reaming operations in the event that the individual tubes/passageways get clogged or narrowed by deposits, the entrance to the small holes/passageways for each such 4-joint section is preferably fluted (funnel shaped) so that the reaming tool will predictably enter the sequential tube/passageway section to ensure that all tubes can be reamed from the surface or from a workover unit.

Third Preferred Embodiment Of The Invention

Figure 11:
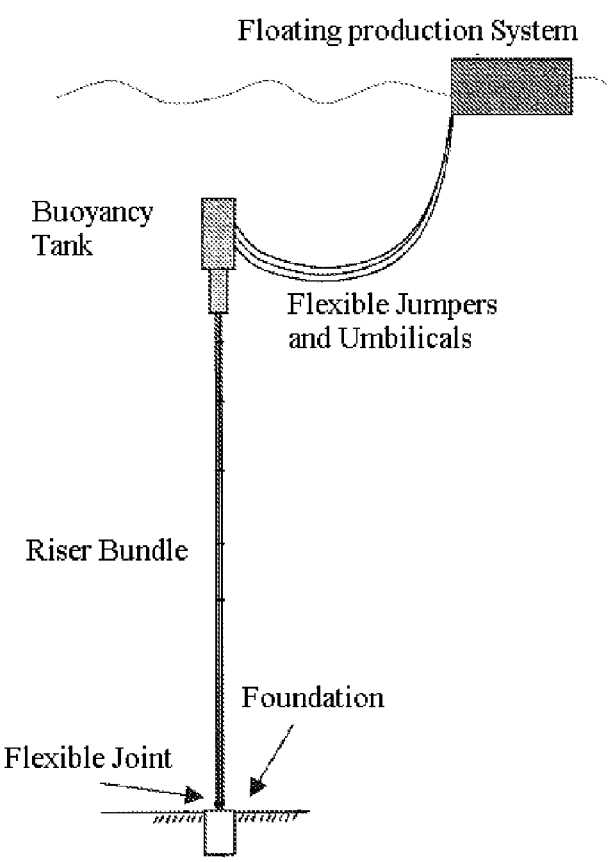
FIG. 11 shows a traditional hybrid riser configuration, FIG. 12 show two views of the flexible jumper according to the third embodiment of the invention.

So-called hybrid risers are a combination of rigid and flexible risers. There are many configurations and permutations of hybrid risers. These riser systems are typically intended to serve a large number of wells, and to improve the interface between subsea and surface facilities, the function of lifting production fluids to near the surface is separated from the function of offloading the fluid to a platform or Floating Production System (FPS), where fluids are then separated and prepared for export. Typically, buoyancy tanks and anchors suspend and position a platform submerged about 200 feet below the surface where the primary risers terminate, and then flexible jumper lines carry the fluid up to the platform or FPS (see FIG. 11).

Figure 12:
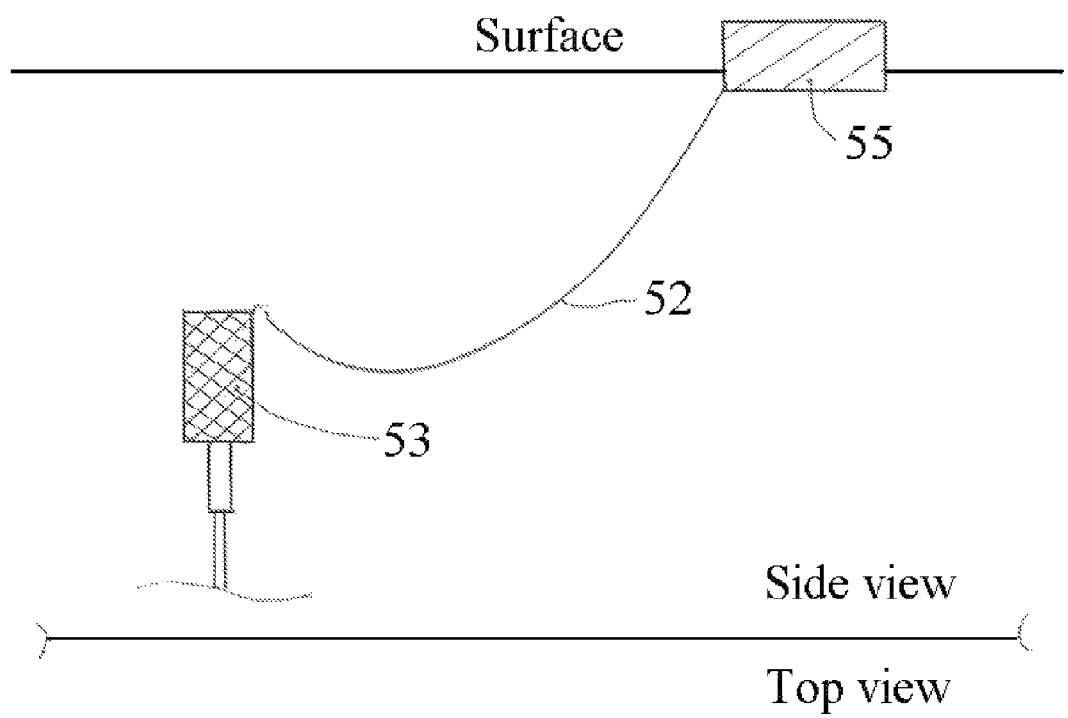
Figure 12:
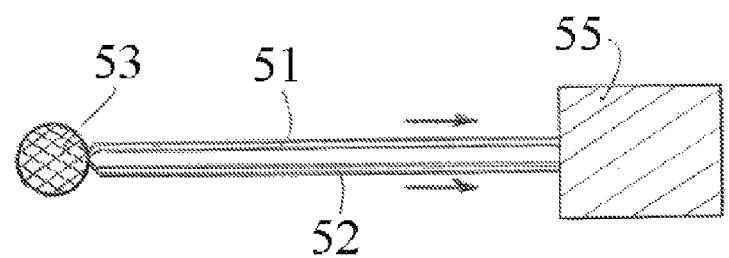

As per FIG. 12, this Third Embodiment of the invention consists of providing a dual flexible jumper line, providing fluid communication between the submerged platform (53) and the surface platform (55). One jumper line (51) is the original open-pipe type with the same termination fittings. The other jumper line (52) is an MCS pipeline (including a plurality of individual pipes, preferably round), such MCS small-diameter tubes preferably only integrated inside the rising/inclining part of the jumper pipeline, together with a pre-mixing device to more-evenly distribute the fluid phases prior to entering the plurality of individual tubes.

Figure 13:
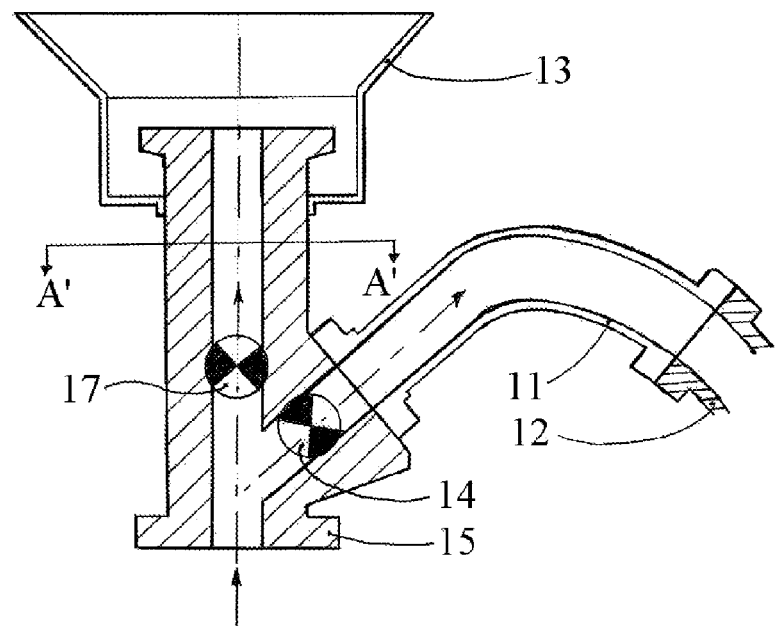
FIGS. 13a and 13b show alternate designs of the inlet or first valve of the third embodiment of the invention.
Figure 13:
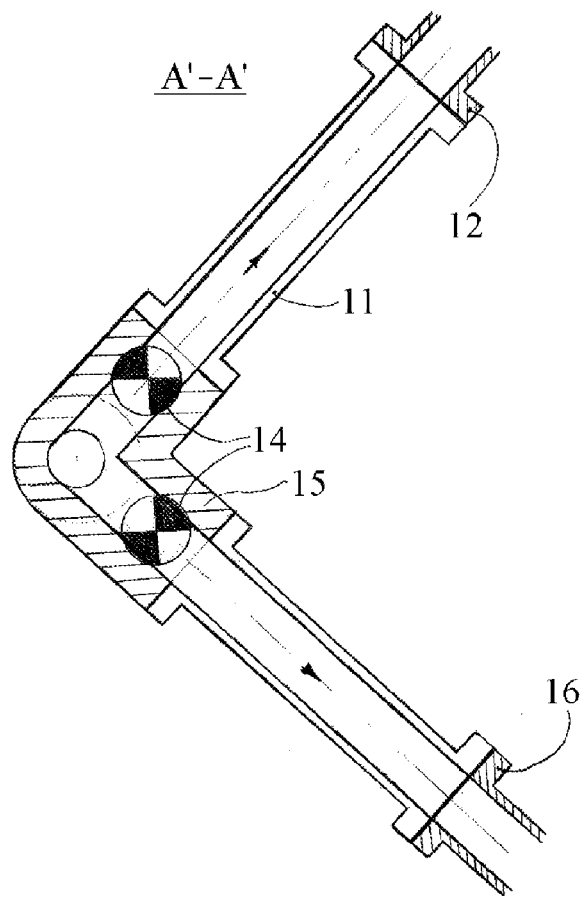

As is practice, the main riser terminates at a submerged platform with an output gooseneck-shaped termination fitting, where the attached flexible jumper line hangs from, such that the angle of its downward incline is similar to the gooseneck's incline, limiting strain. As per the invention, one design configuration is as shown in side and top views (FIG. 13(a) and (b)), a central spool (15) receives fluid from the riser, and integrated control valve means (14) directs such fluid through gooseneck tubes (11) to either the MCS jumper line (16) or to the original open-pipe jumper line (12). Vertical access is provided through valve (17). Such jumper lines can terminate at the surface facilities either as two independent jumper lines or as a combined flow using a fitting to recombine the output of the two jumper lines.

Implementation of the parallel MCS riser system as described in such jumper line is particularly beneficial for a number of reasons. First, given that the gas-liquid ratio becomes larger and larger as the fluid moves toward the production point (gas expansion and more gas coming out of solution with pressure decline), the gas-liquid ratio in the jumper line is the highest of anywhere in the tubing system, and the higher the gas-liquid ratio is, the more effective an MCS riser is in ensuring/increasing liquid production. Second, surface facilities would be protected from severe slugging at a relatively low cost. Third, given such protection from slugging, higher production rates will be permitted (smaller backpressure from surface choke). Fourth, construction is relatively easy and inexpensive, given the relatively short length of the pipe being substituted, and that a jumper line exchange could be implemented during a scheduled shutdown. Fifth, the inclined pipeline configuration (caternary) is particularly inefficient because its upward slope/incline facilitates gas phase slippage past the liquid phase. Also, exchanging the jumper line over time for one with smaller diameter MCS passageways as production declines is easier than in other parts of the riser system.

Fourth Preferred Embodiment Of The Invention

With deepwater oil wells, there is a significant increase in elevation from the seabed to the top of the primary risers terminating at the submerged platform, and so a significant contribution to the backpressure on the reservoir. Such risers can be either caternary or vertical. Implementation of flow through an alternate MCS riser (in parallel) will result in flow that is more efficient in the production of liquid (preserving reservoir energy, reducing producing GLR), reducing backpressure on the formation, and producing fluid at a steady state rate (no slugging behavior) down to a low surface pressure (low line pressure). All MCS riser designs described in the prior embodiments for flexible or steel risers have application with such risers.

Figure 14:
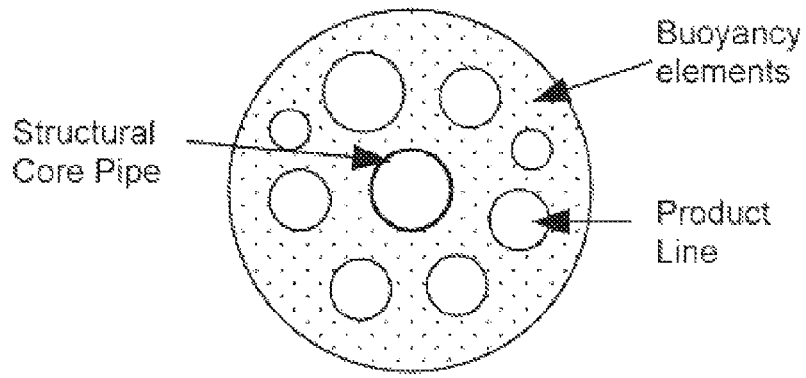
FIGS. 14a and 14b show various riser bundle configurations.
Figure 14:
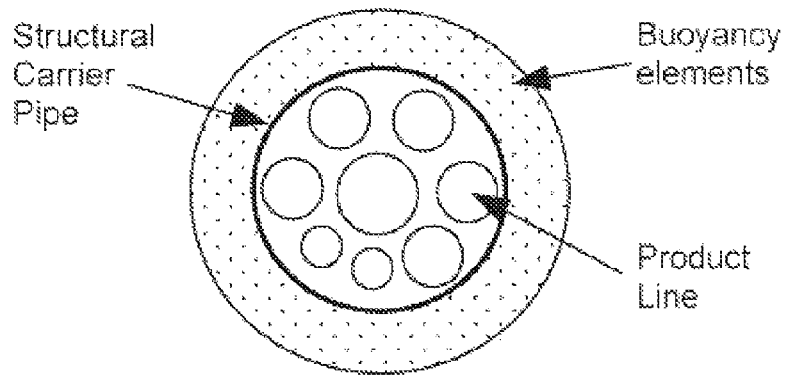
Figure 14:
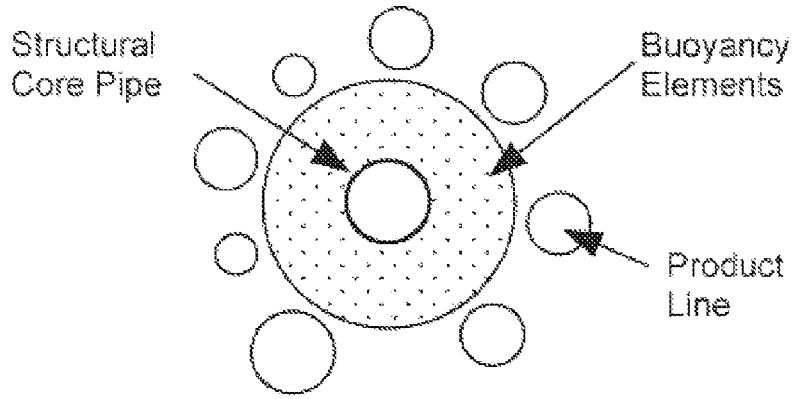

Various cross-section configurations of risers from the seabed to the submerged platform are shown in FIG. 14(a) and (b). The bundled structures includes a steel pipe for strength, insulated production lines, buoyancy capability for weight neutralization, control lines and heating elements, and sometimes including extra lines, valves and manifolds for gaslift. Production risers/lines are placed inside the large-diameter steel pipe, or in parallel and tethered to the main steel pipe. In retrofit operations, additional parallel MCS risers can be tethered to the main riser conduit, while a manifold at the base can divert flow into the MCS riser upon activation of surface-controlled valves, terminating at the submerged platform. Given the buoyancy of extruded elastomer material, buoyancy equalization requirements will be less.

Figure 15:
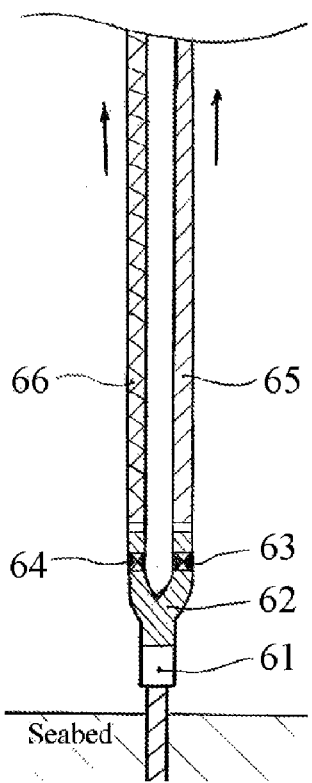
FIG. 15 shows a fourth embodiment of the invention.
Figure 16:
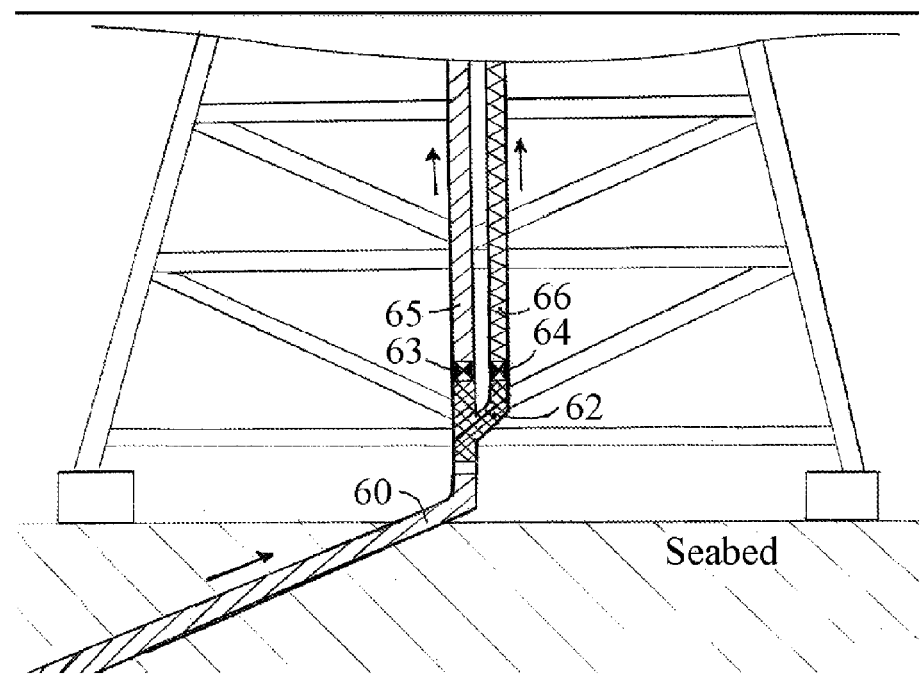
FIG. 16 shows an alternate configuration of the fourth embodiment of the invention.

Two types of vertical risers of the invention flowing upward to submerged or surface platforms are shown in FIGS. 15 and 16. In FIG. 15, fluid produced by the well flows through wellhead (61) to Y-joint (62), where the flow can be directed up open-pipe riser (65) controlled by valve means (63) or up MCS riser (66) controlled by valve means (64). In FIG. 16, fluid supplied by well pipeline (60) flows through Y-joint (62), where the flow can be directed up open-pipe riser (65) controlled by valve means (63) or up MCS riser (66) controlled by valve means (64).

Figure 17:
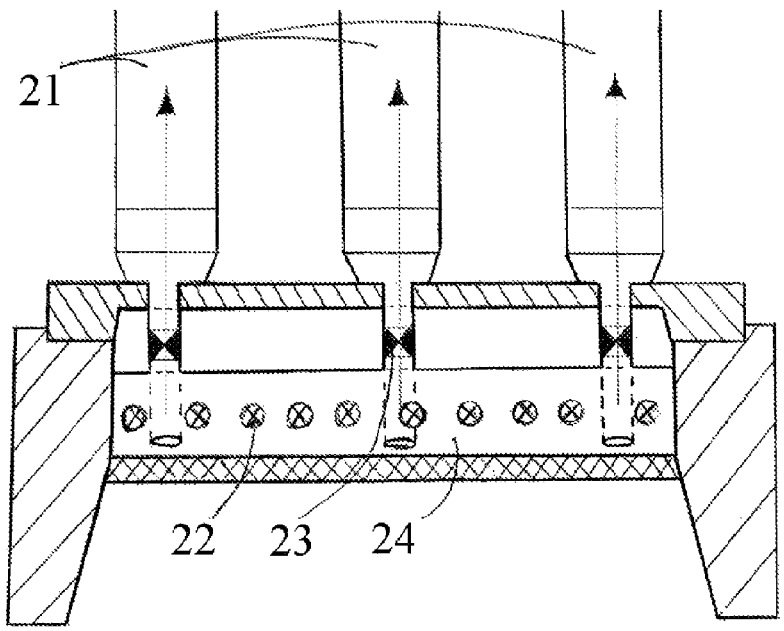
FIGS. 17a and 17b show views (side and top) of manifold/multiple-riser configuration.
Figure 17:
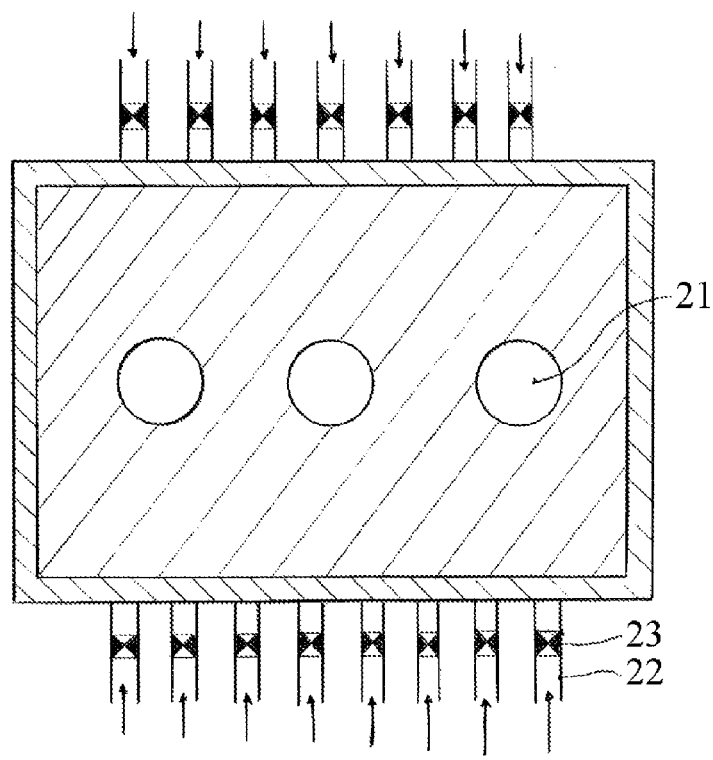

In situations where a high number of wells utilize the same submerged platform of a hybrid riser, an additional level of optimization of the riser system can be achieved by adding volumetric flexibility to the system. In such hybrid riser system of the invention (see FIG. 17(a) and (b) for a side and top view), each of a plurality of parallel large outer-diameter MCS riser conduits (21) (flexible or steel/rigid, vertical or caternary) is selectively fed fluid at its base by a manifold tank/pipe (24) that receives incoming fluid from production lines (22) from nearby producing wells, and at the top of such MCS risers is preferably a receiving manifold (not shown) that combines such MCS riser produced fluid for output through a number of selectively producing jumper lines terminating at the surface platform or FPS. This arrangement reduces the number of (MCS) risers that must be accommodated by the submerged platform, and potentially reduces the number jumper lines from the submerged platform to the surface platform or FPS. If pigging operations can originate/terminate in the manifold at the base of the MCS risers, capable of servicing all wells producing fluid into the manifold, then separate risers for each well (traditional open pipe type) to the submerged/surface platforms are less needed.

For purposes of illustration, a dual MCS riser system is assumed to consist of seven parallel individual MCS risers (~20 inches in diameter not including buoyancy devices), for example either configured as a bank of them in a line, or with one in the middle surrounded by the others and bound together by spacers and fasteners at different heights up the risers. At the bottom is a manifold capable of receiving input from for example 20 wells and its output flows combine together and can flow into the seven parallel MCS risers, but the number of MCS risers actually producing fluid can be managed individually (valve control means 23) to control the volumetric characteristics of the system, improving flow assurance and optimizing conditions over the life of the wells or as wells are added or taken off line. By employing a variety of parallel MCS riser conduits, either having volumetric characteristics different from each other (consisting of a different number of small tubes of the same diameter, and so a different combined cross section), or consisting of a different diameter of internal holes/passageways (to vary the extent of interaction between the carrier phase, gas, and the carried phase), multiphase flow transporting efficiency can be optimized and backpressure can be minimized by adjustment of the number of MCS riser conduits producing fluid to fit existing conditions, along with selecting which MCS riser conduits to produce fluid through based on the conditions of flow (i.e. flow volume, size of the gas void fraction, etc.).

Volumetric considerations also apply as the fluid flows up the riser. Pressure at the base of a 6,000-foot riser can be 4,000 psi and more, implying significant solution gas remaining in the liquid. Assuming backpressure of 1,000 psi at the surface choke, as fluid rises in the column more gas comes out of solution and the initial gas expands by a factor of 4 (the volume of gas doubles each time the pressure is reduced by half). Producing through MCS riser conduits allows production to flow with exit line pressure of 100 psi or less, implying an expansion of the gas by a factor of more than eight times more (2×2×2), not including any additional gas coming out of solution. While flowing through smaller-diameter tubes has the positive effect of increasing the interfacial contact between the phases and stabilizing flow (transferring its energy), such tubes are more susceptible to the "choked condition" at relatively lower velocities, where flow volume becomes constricted (highly inefficient) beyond a certain point. Therefore, given that managing the flow velocity through the small-diameter tubes of the MCS riser is an important factor in maximizing/ensuring fluid flow, and given that the volume of the gas phase increases at an exponential rate as the fluid rises up the well column, it is recommended that the number of (same diameter) small tubes included within the downstream joint segments be increased, thereby increasing the effective cross section of the flow (volumetric increase) in order to maintain the velocity of the fluid within the desired range and so prevent choking flow.

Fifth Preferred Embodiment Of The Invention

Hilly terrain (defined as having an incline exceeding 1 degree) is conducive to slug formation in subsea and land-based production flowlines, especially when stratified flow is the prevailing gas-liquid flow pattern, where even a 1 degree incline in the pipeline can lead to large liquid slug accumulations at low elevations in the pipeline and result in flow inefficiencies/difficulties. The slug formation cycle has three phases, 1) low spots fill with liquid and gas flow is blocked, 2) pressure builds up behind the blockage, and 3) when the pressure becomes high enough, gas blows the liquid out of the low spot as a slug. Hilly terrain slugging can be very severe, causing large pressure variations and liquid surges in the pipeline. When a liquid slug blocks the flow of gas, additional backpressure is imposed on the reservoir formation, wasting potential energy. Slugs form in the low elevations during shutdowns, aggravating the start-up process.

Several methods of controlling slugging behavior in pipelines with hilly terrain have been proposed and utilized. Gas lift has been used with some success, lightening the mass of the slug, but requiring gas compression and external energy supply. Additional choking upstream of the separator and possibly coordinating with choking at the wellhead/upstream have been studied extensively and used with limited success. Downhole separators have also been proposed to eliminate the local multiphase flow problem by removing the gas phase, but such separators are still in their development stage and add complexity and cost to the system. Multi-phase pumps are a proven technology and have been successfully implemented, but they are expensive and costly to operate.

Figure 18:
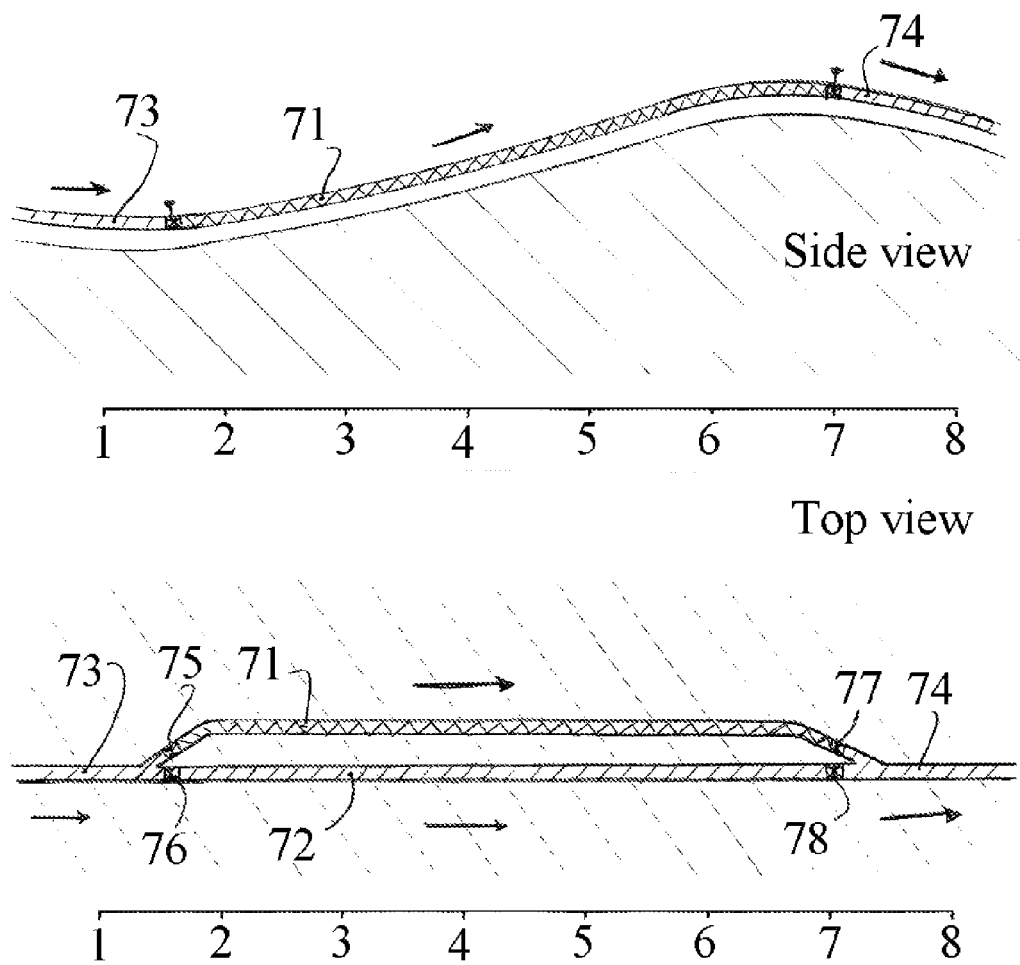
FIG. 18 shows a side and top view of the fifth embodiment of the invention to be used with an inclined pipeline.

In accordance with the invention, as per FIG. 18 representing side and top views, in an inclining region of a pipeline, a dual pipeline segment is formed. In one pipeline segment (72), an open-pipe tube providing access for pigging, etc. is provided with inlet valve control means (76) and outlet valve control means (78). A second MCS pipeline segment (71) is a conduit with a plurality of separate parallel internal passageways having inlet valve control means (75) and outlet control means (77). Fluid from upstream pipeline (73) is directed to each segment with a Y-joint, and both pipeline segments are rejoined with a Y-joint to become downstream pipeline (74). The Y-joint in the pipeline (73) to direct flow into the MCS pipeline segment (71) is preferably near the low elevation point in the hilly terrain pipeline, recombining back into the main flow somewhere after the peak elevation of the inclining section of the pipeline, where gravity will ensure the continued downstream movement of the liquid. Injection of inhibitor liquids and heating elements are optional.

It is important that the fluid approaching the entrance of the parallel MCS pipeline segment be mixed to result in an equal proportion of gas and liquid entering each of the individual small-diameter parallel tubes. Consequently, a mixing element (such as a choking element "turbulence inducer", etc.) is used to disperse the liquid phase evenly within the gas phase immediately before the entrance to the parallel MCS pipeline segment. The lower the standard deviation of mass of the fluid entering each of the individual tubes, the more equal will be the flow resistance within each of the tubes, and so a beneficially more-equal fluid production rate between them. If some of the tubes have a smaller volume of liquid in them, their lower flow resistance (and so an increased flow rate of gas) will mimic the condition of stratified flow in a large round pipe, resulting in higher gas slippage past the liquid and less pressure differential to transport the liquid up and over the incline through the remaining small-diameter tubes, a condition to avoid.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A tubing system for transporting a gas-liquid flow from a petroleum wellbore to a production point, the tubing system comprising a dual pathway section in fluid communication with the wellbore and the production point, said dual pathway section comprising:
   a first tubing portion directing said flow towards the production point,
   a second tubing portion comprising a plurality of parallel channels, bundled or commonly formed together in a pipe said second tubing portion directing said flow towards the production point,
   a first valve to direct said flow from the well to either the first tubing portion or the second tubing portion,
   whereby when in said second tubing portion, said gas-liquid flow is divided into a plurality of individual flows through said plurality of parallel channels along at least a portion of said second tubing portion.

2. The tubing system as in claim 1, wherein said dual pathway section is located along an inclined portion of said tubing system between said wellbore and said production point.

3. The tubing system as in claim 1 further including an upstream section between the well and said dual pathway section, said first tubing portion having a diameter equal or greater to a diameter of said upstream section.

4. The tubing system as in claim 1, wherein said first valve adapted to stop flow through said tubing system.

5. The tubing system as in claim 1, wherein said dual pathway section further including a second valve between said first valve and said production point to direct flow from either the first tubing portion or the second tubing portion towards the production point, whereby when said first valve is operated to direct said gas-liquid flow to said first tubing portion, said second valve is operated to direct said gal-liquid flow from said first tubing portion towards said production point, and when said first valve is operated to direct said gas-liquid flow to said second tubing portion, said second valve is operated to direct said gal-liquid flow from said second tubing portion towards said production point.

6. The tubing system as in claim 1, wherein said first valve including a first valve control means, said first valve control means operable to cause said first valve to direct said flow from the wellbore to either the first tubing portion or the second tubing portion.

7. The tubing system as in claim 1, wherein said tubing system is connecting the wellbore and a gathering line for transporting said flow from said wellbore to said gathering line and further to said production point.

8. The tubing system as in claim 2, wherein said inclined section is a riser.

9. The tubing system as in claim 2, wherein said inclined section is located in a jumper line.

10. The tubing system as in claim 2, wherein said inclined section is between said wellbore and said production point.

11. The tubing system as in claim 1, wherein said second tubing portion is made from an extruded elastomer with internal passageways therethrough.

12. The tubing system as in claim 1, wherein said second tubing portion having a circular overall cross-section shape and including said plurality of parallel channels, said channels having individual cross-section shapes forming together said overall circular cross-section shape of said second tubing portion.

13. The tubing system as in claim 12, where said second tubing portion having a circular cross-section shape, said second tubing portion is encased in a conduit.

14. The tubing system as in claim 1, wherein said parallel channels are formed by a plurality of round tubes bundled together.

15. The tubing system as in claim 14 further including a filler between said round tubes.

16. The tubing system as in claim 14, wherein said round tubes are encased in a conduit.

17. The tubing system as in claim 11 further including a communication means to at least one of said internal passageways to inject fluids in a direction opposite to said flow.

18. The tubing system as in claim 11, wherein said second tubing portion includes internal passages for electrical wires or fiber-optic lines.

19. The tubing system as in claim 1 further including heating elements spaced along at least a portion thereof.

* * * * *